United States Patent
Sahagun (10) Patent No.: US 11,423,224 B2
(45) Date of Patent: Aug. 23, 2022

(54) IMAGE-TO-TEXT RECOGNITION FOR A SEQUENCE OF IMAGES

(71) Applicant: KYOCERA Document Solutions, Inc., Osaka (JP)

(72) Inventor: Allan Sahagun, Oakland, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 607 days.

(21) Appl. No.: 16/441,298

(22) Filed: Jun. 14, 2019

(65) Prior Publication Data

US 2020/0394266 A1 Dec. 17, 2020

(51) Int. Cl.
*G06F 40/279* (2020.01)
*G06V 10/70* (2022.01)
*G06V 30/242* (2022.01)
*G06V 30/10* (2022.01)

(52) U.S. Cl.
CPC .......... *G06F 40/279* (2020.01); *G06V 10/768* (2022.01); *G06V 30/242* (2022.01); *G06V 30/10* (2022.01)

(58) Field of Classification Search
CPC ..... G06F 40/279; G06F 40/30; G06V 10/768; G06V 30/242; G06V 30/10; G06V 30/153
USPC .............................................................. 704/9
See application file for complete search history.

(56) References Cited

U.S. PATENT DOCUMENTS

| | | |
|---|---|---|
| 7,672,538 B2 | 3/2010 | Aiso |
| 9,591,203 B2 | 3/2017 | Uekusa et al. |
| 2016/0227092 A1 | 10/2016 | Ikeda |

*Primary Examiner* — Thierry L Pham
(74) *Attorney, Agent, or Firm* — W. Eric Webostad (57) ABSTRACT

Systems and methods relate generally to image-to-text recognition. In an example thereof, a device captures an image and generates image data and associated meta data. A parser parses the image data and the meta data into sub-image data and sub-meta data, respectively. A recognizer renders the sub-image data into strings for one or more identified objects in the sub-image data. A mapper-controller maps the sub-image data in association with the sub-meta data to generate a data structure having positional information with respect to the one or more identified objects. A dictionary store is accessed by a natural language processing engine responsive to the strings. The natural language processing engine converts the strings into a natural language expression for the strings and the positional information obtained from the data structure.

8 Claims, 9 Drawing Sheets

IMAGE-TO-TEXT RECOGNITION FOR A SEQUENCE OF IMAGES

FIELD

The following description relates to recognition of objects in a sequence of images. More particularly, the following description relates to image-to-text recognition for a sequence of images.

BACKGROUND

Conventionally, a single digital photo may be processed for image-to-text recognition such as with an app on a smart phone.

SUMMARY

In accordance with one or more below described examples, a system relating generally to image-to-text recognition is disclosed. In such a system, a device is configured to capture frames for an image and generate image data therefor. A parser is configured to parse the image data from each of the frames into corresponding sub-images. A recognizer is configured to render one or more identified objects in the sub-images to one or more strings. The recognizer is configured to generate meta data for the strings. A mapper is configured to map the meta data in association with the one or more identified objects to generate tracking information. A first comparator is configured to compare the tracking information between the frames to obtain positional information. A string store is configured to group the strings of each of the frames for a frame-to-frame comparison of groups of the strings. A second comparator is configured to frame-to-frame compare groups of the strings to obtain difference information. A third comparator is configured to compare the strings with one or more language libraries to identify potential words and rank the potential words using the difference information. A natural language processing engine is configured to access the one or more language libraries and to convert one or more of the potential words into a natural language expression using the positional information.

In accordance with one or more below described examples, another system relating generally to image-to-text recognition is disclosed. In such a system, a device is configured to capture frames of an image and generate image data and associated meta data. A parser is configured to parse the image data and the meta data into sub-image data and sub-meta data, respectively. A recognizer is configured to render the sub-image data into strings for one or more identified objects in the sub-image data. A mapper-controller is configured to map the sub-image data in association with the sub-meta data to generate a data structure having positional information with respect to the one or more identified objects. A dictionary store is accessible by a natural language processing engine responsive to the strings. The natural language processing engine is configured to convert the strings into a natural language expression for the strings and the positional information obtained from the data structure.

In accordance with one or more below described examples, a method relating generally to image-to-text recognition is disclosed. In such a method, a device captures an image and generates image data and associated meta data. A parser parses the image data and the meta data into sub-image data and sub-meta data, respectively. A recognizer renders the sub-image data into strings for one or more identified objects in the sub-image data. A mapper-controller maps the sub-image data in association with the sub-meta data to generate a data structure having positional information with respect to the one or more identified objects. A dictionary store is accessed by a natural language processing engine responsive to the strings. The natural language processing engine converts the strings into a natural language expression for the strings and the positional information obtained from the data structure.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 9-1 through 9-3 are pictorial diagrams depicting an example of an image-to-text recognition flow for a sequence of images.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A person may come upon a series of words or symbols needing to be translated or otherwise processed to impart meaning. Sometimes it is not possible or convenient to manually enter such words or symbols, and so entry with a digital photo is a quick short cut to such manual entry.

However, it may not be possible to capture all of such words or symbols with sufficient size in a single conventional digital photo.

As described below, a sequence frames may be used to capture images containing such words or symbols. These sequences of frames may be processed to impart a meaning to a user of such words or symbols.

With the above general understanding borne in mind, various configurations for image-to-text recognition systems and methods are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product(s). Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 1:
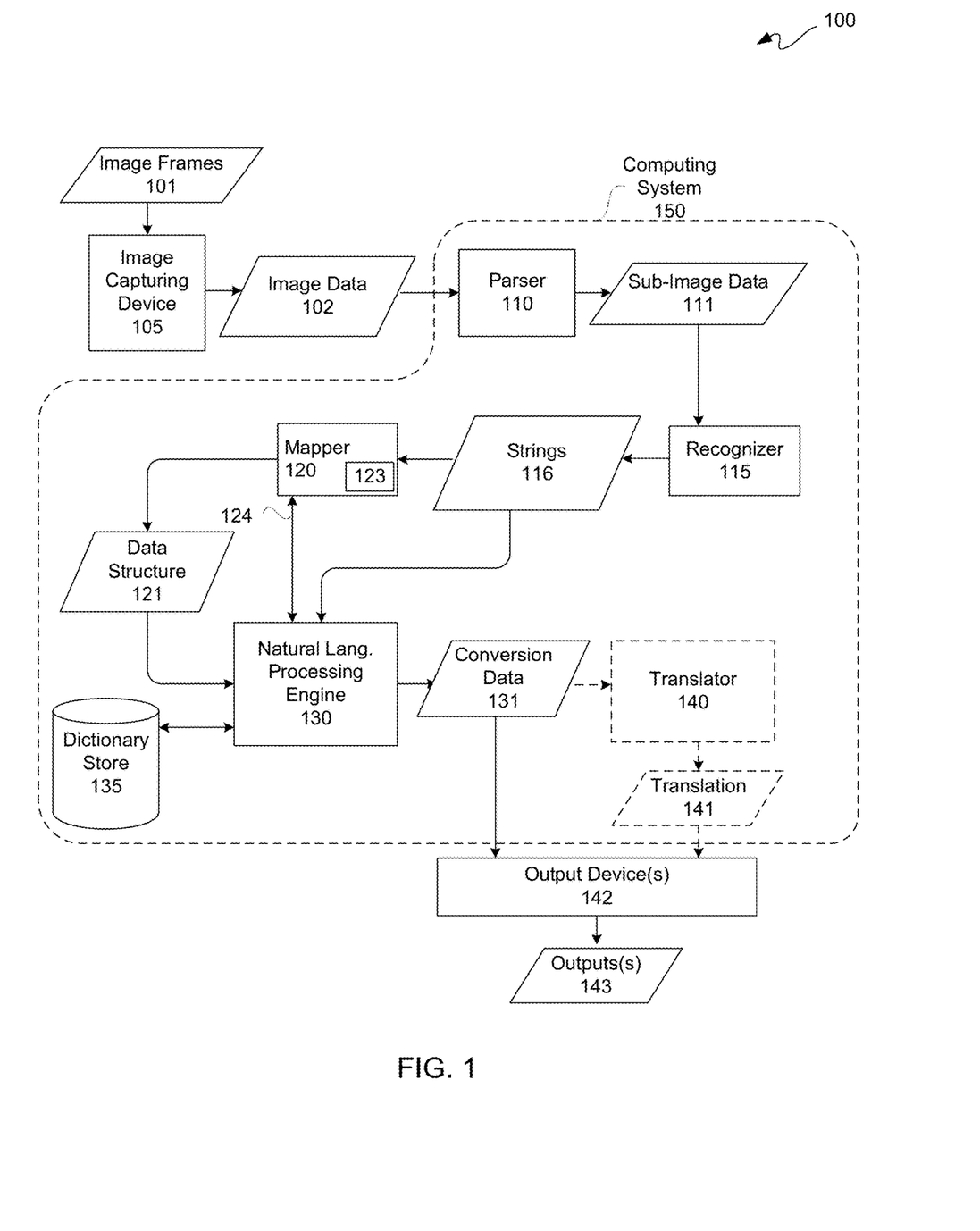
FIG. 1 is a block-flow diagram depicting an example of an image-to-text recognition system.

FIG. 1 is a block-flow diagram depicting an example of an image-to-text recognition system 100. Image-to-text recognition system 100 includes obtaining a sequence of image frames 101 by an image capturing device 105 for an "image." Even though an "image" as used herein has multiple frames, and thus multiple images, for purposes of clarity an "image" refers to a sequence of sub-images, such as a sub-image per frame, to provide an overall image.

An image capturing device 105 may be any electronic device having a capability of capturing a digital image. Along those lines, a succession of image frames may be captured using a video or a photo setting of an image capturing device 105 to provide an image. Examples of an image capturing device 105 include a mobile phone, a tablet or pad, a notebook computer, a camera, a video camera, or any other electronic device with a digital camera. Furthermore, an image capturing device 105 may be a printer, such as for example a multi-function printer (MFP) including a scanner. For purposes of clarity by way of non-limiting example, it shall be assumed that image capturing device 105 is a mobile device with a camera, such as for example a mobile phone.

Image capturing device 105 ("mobile device 105") may be configured to capture image frames, including still and/or video, and generate image data 102 and associated meta data. Image data 102 may include a digital panorama photo, a digital still photo, a video clip, or a graphical interchange formatted clip, among other types of images.

Mobile device 105 may be in communication with a computing system 150. Such communication between image capturing device 105 and computing system 150 may be wired and/or wireless. In an example, computing system 150 may be a cloud-based system configured to provide SaaS.

Mobile device 105 may provide image data 102, and optionally associated meta data discussed below, to a parser 110 of computing system 150. Computing system 150 may further include an encoder 115, a mapper-controller ("mapper") 120, a natural language processing engine 130, and optionally a translator 140. Computing system 150 may include a dictionary store 135; however, computing system 150 may in communication with an external dictionary store 135. In this example, dictionary store 135 is assumed to be part of computing system 150 for purposes of clarity by way of non-limiting example.

Furthermore, computing system 150 may optionally include one or more output devices of output devices 142. However, for purposes of clarity by way of example, one or more output devices 142 are assumed to be of mobile device 105, such as a display and/or speaker of a mobile phone for example.

Parser 110 may be configured to parse image data 102 into sub-image data 111. With respect to sub-image data 111, parser 110 may be configured to parse such image data into frames with each frame thereof having a sub-image of an associated one of sub-images. Sub-image data 111 may be provided to an encoder 115.

In this example, encoder 115 includes at least one recognition encoder configured to encode sub-images of sub-image data 111 into strings 116. More particularly, encoder ("recognizer") 115 may be configured to render one or more identified objects in sub-images of sub-image data 111 into strings 116. Sub-images of sub-image data 111 may correspond to frames of a captured image. Such identified objects may include one or more symbols, words, characters, ideograms, icons, emojis, or logograms. Strings 116, which may include location data of such one or more identified objects within a corresponding sub-image or sub-images, may be provided to mapper 120 and to natural language processing (NLP) engine 130.

Mapper 120 may be configured to map strings based on location to provide a data structure 121. In this example, mapper 120 may include a controller 123 for controlling operation of NLP engine 130 via control signaling 124.

Mapper 120 may be configured to map a sequence of strings 116 to provide positional information regarding strings 116 in a data structure 121. Generally, mapper 120 may be configured to map locations of strings 116 to generate a data structure 121 having positional information with respect to one or more identified objects. Locations of strings may for example be locations of words in image frames, and locations of such words may be used to concatenate such words into a phrase for example.

Data structure 121 may be provided to NLP engine 130 for correspondence with associated strings 116. A dictionary store 135 may be accessible by NLP engine 130 responsive to strings 116. NLP engine 130 may be configured to convert strings into a natural language expression for strings 116 and associated positional information obtained from data structure 121.

NLP engine 130 may output a natural language expression for strings 116 as conversion data 131. Conversion data 131 may be input to an optional translator 140. For example, conversion data 131 may be in kanji, hiragana and/or katakana, and translator 140 may be for translation of conversion data into English. However, one or more of these and/or other writing systems or languages may be used. Translator 140 may translate conversion data 131 into a translation 141.

Conversion data 131 and/or translation 141 may be provided to one or more output devices 142 to provide one or more outputs 143. For example, a display screen may display conversion data 131 and a translation 141 thereof. In another example, an output device may provide a text-to-speech audible output of conversion data 131 and/or translation 141. Furthermore, both visual and audible outputs may be provided for conversion data 131 and/or translation 141.

Figure 2:
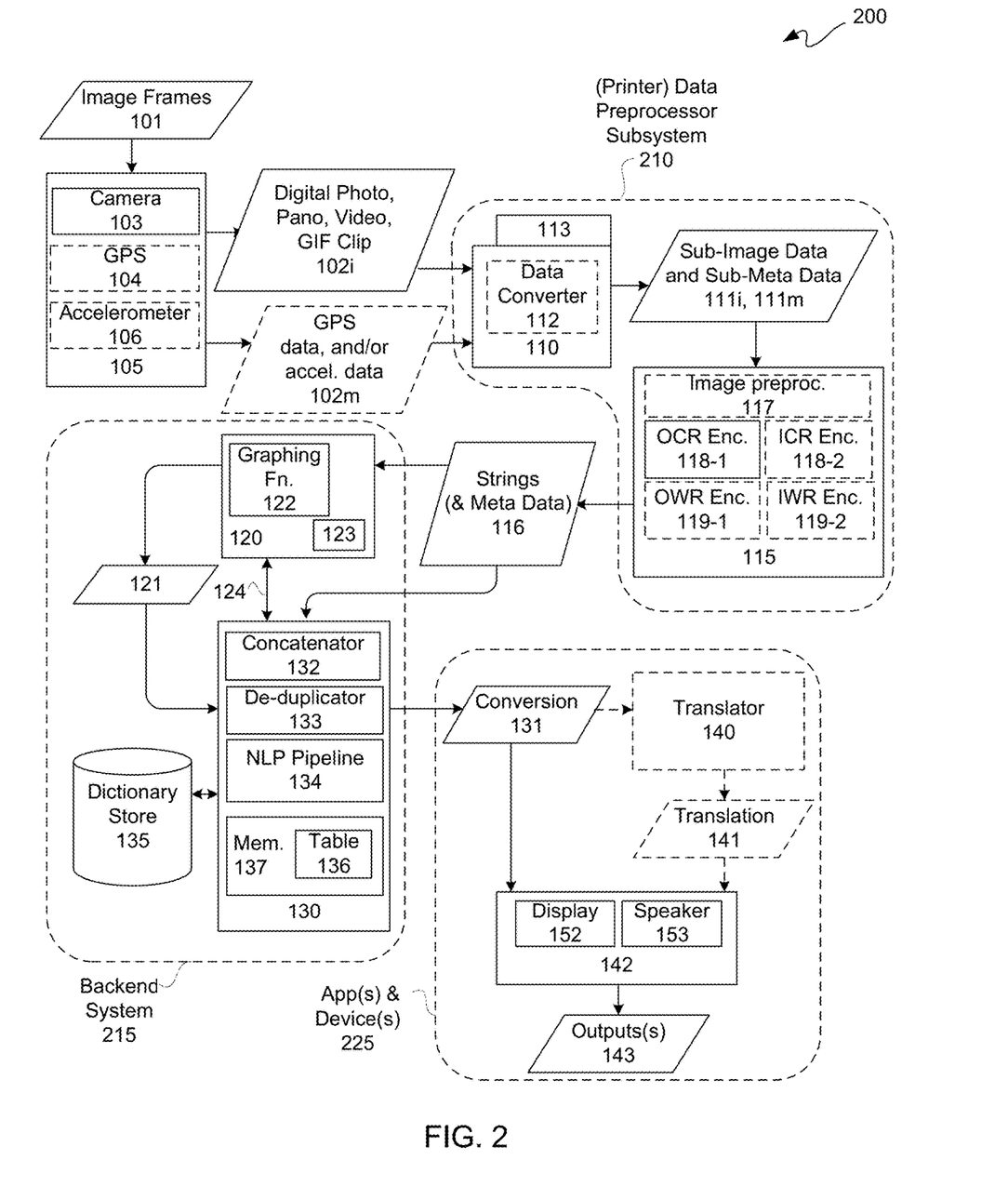
FIG. 2 is a block-flow diagram depicting an example of another image-to-text recognition system.

FIG. 2 is a block-flow diagram depicting an example of another image-to-text recognition system 200. As some of the details regarding image-to-text recognition system 200 are the same as for image-to-text recognition system 100, some of those details are not repeated for purposes of clarity and not limitation.

Image-to-text recognition system 200 includes obtaining a sequence of image frames 101 by an image capturing device 105, which in this example is a mobile device 105. Captured image frames 101 may be provided by mobile device 105 as digital photos, a digital panorama photo ("pano"), a video clip, or a graphical interchange formatted (GIF) clip 102$i$.

In this example, a mobile device 105 optionally includes one or more accelerometers 106 to sense one or more of movement, direction, speed, or tilt of mobile device in association with capture of image data to provide at least a portion of meta data 102$m$.

Mobile device 105 may optionally include a global positioning system (GPS) 104 to obtain geolocation information regarding mobile device 105. Mobile device 105 may further provide such geolocation information as at least a portion of meta data 102$m$.

Meta data 102$m$ may include GPS data and/or accelerometer data. GPS data may include geolocation information with respect to a location of mobile device during capture of image. Accelerometer data may include one or more of movement, direction, speed, or tilt of mobile device 105 in association with capture of image data.

Mobile device 105 may be in communication with a data preprocessor subsystem 210. Data preprocessor subsystem 210 may be of a printer, such as a MFP. Such communication between mobile device 105 and data preprocessor subsystem 210 may be wired and/or wireless.

Data preprocessor subsystem 210 may include a parser 110 and a recognizer 115. In this example, parser 110 may optionally include a data converter 112. Data converter 112 may convert image data 102$i$ for preprocessing. Furthermore, meta data 102$m$ may be stored in association with corresponding image data 102$i$ in table memory 113.

Data converter 112 may be used to provide sub-image data 111$i$ and optionally sub-meta data 111$m$ to recognizer 115. In this example, recognizer 115 includes an optional image preprocessor 117, an optional character recognition (OCR) encoder 118-1, an optional intelligent character recognition (ICR) encoder 118-2, an optional optical word recognition (OWR) encoder 119-1, and/or an optional intelligent word recognition (IWR) encoder 119-2. Image preprocessor 117 may be configured to preprocess sub-images of sub-image data 111*i* prior to encoding into strings 116.

Again, recognizer 115 may be configured to render one or more identified objects in sub-images of sub-image data 111*i* into strings 116. Such one or more identified objects may include one or more symbols, words, characters, ideograms, icons, emojis, or logograms. In this example, strings 116, which may have appended thereto location and other meta data, may be output from data preprocessor subsystem 210. Again, location data for strings may be indicate position of such one or more objects for such strings in one or more sub-images. Recognizer 115 may be configured to provide a ranking for each string of strings 116, where such a string has multiple recognitions, such as for example multiple words.

For an SaaS cloud-based implementation, a backend system 215 may include a mapper 120 and an NLP engine 130. Such backend system 215 may or may not include a dictionary store 135; however, such backend system 215 has access to a dictionary store 135.

Strings 116, which may have appended thereto frame data, location data, GPS data, accelerometer data, or other meta data for such strings, may be provided to mapper 120. Strings 116, and meta data for such strings, may be provided to NLP engine 130. NLP engine 130 may include memory 137. Memory 137 may store for strings, as well as frames, location information, and/or other meta data, in a table for association with one another.

In this example, mapper 120 has a graphing function 122 for graphing strings responsive to associated location data to generate a graphic data structure 121. Graphic data structure 121 may be provided to NLP engine 130.

NLP engine 130 may use graphic data structure 121, strings and in-frame location data 116 to concatenate words and/or symbols such as by a concatenator 132 of NLP engine 130. A concatenated output from concatenator 132 may be provided to de-duplicator 133 of NLP engine 130, and de-duplicator 133 may remove any duplicates from such concatenation. A de-duplicated concatenated string of words and/or symbols may be provided to an NLP pipeline 134 of NLP engine 130 to generate one or more conversions 131. NLP engine 130 may have access to a dictionary store 135 or more broadly the Internet for generating one or more possible conversions 131.

A mobile device 105 may include one or more devices and/or be programmed with one or more applications (apps) ("app(s) and device(s)") 225 for using and/or outputting one or more conversions 131. An optional translator 140 and one or more output devices 142 may be of or associated with a mobile device 105.

Along those lines, possible conversions 131 may be ranked by NLP engine 130, and one or more likely conversions 131 may be output from NLP engine 130 to a mobile device 105, which may be communicated through wireless and/or wired interconnection. Conversions or conversion data 131 may optionally be translated, as previously described.

Such conversions 131 and one or more corresponding translations 141 may be provided to one or more output devices 142 of a mobile device 105 to provide one or more outputs 143. For example, a display screen 152 may display conversions 131 and translations 141 thereof. In another example, at least one speaker 153 of an output device 142 of a mobile device 105 may provide a text-to-speech audible output of conversions 131 and/or translations 141.

Figure 3:
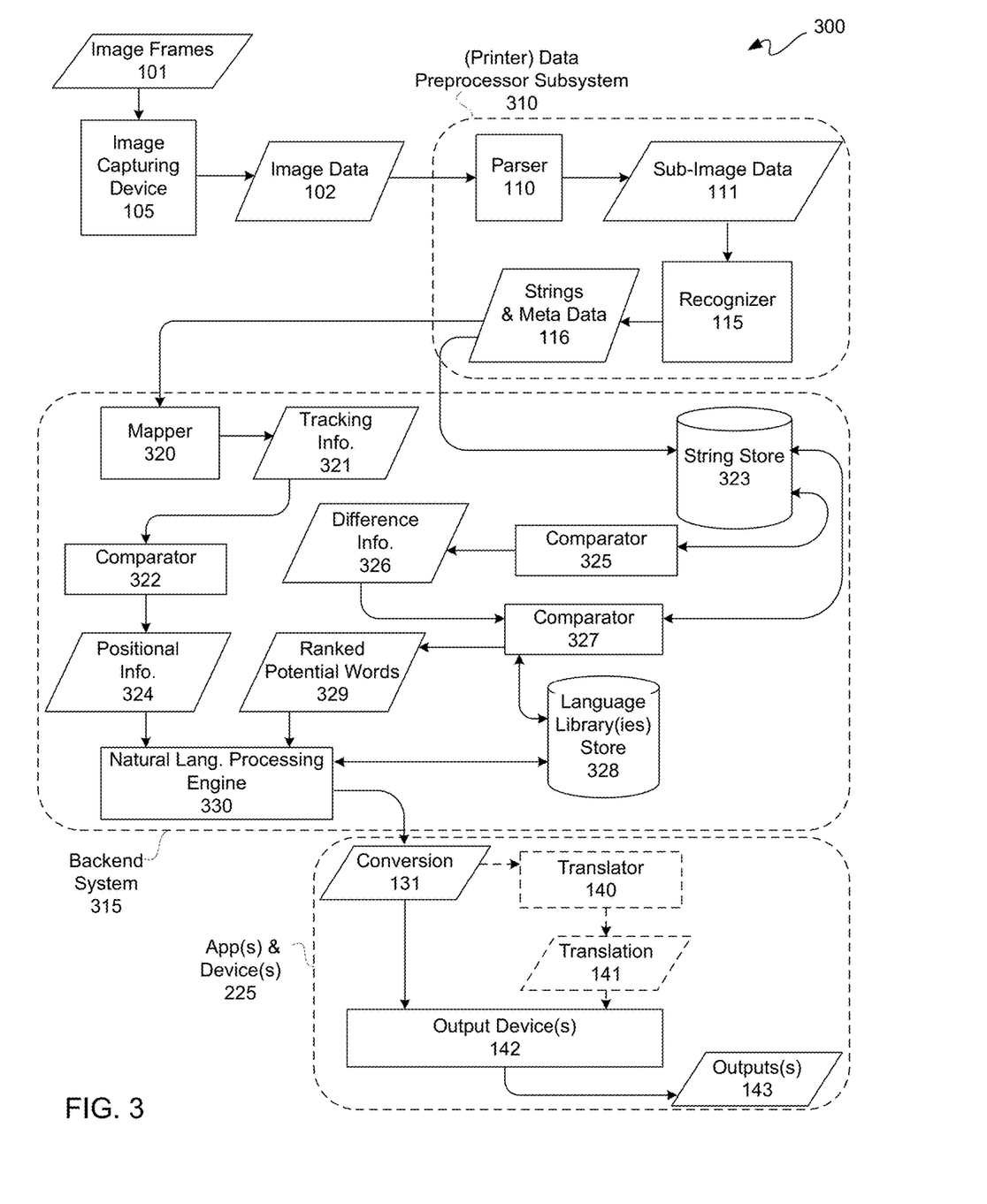
FIG. 3 is a block-flow diagram depicting an example of yet another image-to-text recognition system.

FIG. 3 is a block-flow diagram depicting an example of yet another image-to-text recognition system 300. As some of the details regarding image-to-text recognition system 300 are the same as for image-to-text recognition systems 100 and 200, some of those details are not repeated for purposes of clarity and not limitation.

Image-to-text recognition system 300 includes obtaining a sequence of image frames 101 by a mobile device 105. Mobile device 105 may be configured to capture image, including still and video, frames of an image and generate image data 102 and associated meta data.

Mobile device 105 may be in communication with a data preprocessor subsystem 310, such as of a printer for example. Such communication between mobile device 105 and data preprocessor subsystem 310 may be wired and/or wireless.

Data preprocessor subsystem 310 may include a parser 110 and a recognizer 115. Mobile device 105 may provide image data 102, and optionally associated meta data, to a parser 110. Parser 110 may be configured to parse image data 102, and optional associated meta data, into sub-image data 111, which sub-image data may optionally include sub-meta data. Sub-image data 111, along with optional sub-meta data, may be provided to recognizer 115.

Recognizer 115 may be configured to render one or more identified objects in sub-images of sub-image data 111 into strings 116. Strings 116 may be provided to mapper 320 and to string store 323.

Recognizer 115 optionally may be configured to generate meta data for strings 116. For purposes of clarity by way of example and not limitation it is assumed that strings 116 includes meta data, namely strings and meta data 116.

Mapper 320 and string store 323 may be of a backend system 315, which backend system 315 may further include comparators 322, 325, and 327, a NLP engine 330, and a language library or libraries store ("language library store") 328. Mapper 320 may be configured to map meta data, including location meta data of one or more objects within each sub-image, in association with strings 116 to generate tracking information 321. Mapper 320 may be less complicated than mapper 120, as mapper 320 is not used to control NLP engine 330 in this example.

Comparator ("first comparator") 322 may be configured to compare tracking information 321 between frames, namely meta data corresponding to image frames 101, to obtain or generate positional information 324. In other words, location data may indicate locations where words or symbols represented as strings 116 appear in frames 101. Such positional information 324 may be provided to NLP engine 330.

In parallel, a string store 323 may be configured to group strings 116, including meta data, of each of frames 101 for a frame-to-frame comparison of groups of strings 116. A comparator ("second comparator") 325 may be configured for a frame-to-frame comparison of groups of strings 116 obtained from string store 323 to obtain or generate difference information 326.

A comparator ("third comparator") 327 may be configured to compare strings 116 with one or more language libraries of language library store 328 to identify potential words and to rank such potential words using difference information 326. Comparator 327 may output ranked potential words 329 for input to NLP engine 330.

NLP engine 330 having access to one or more language libraries of language library store 328 may be configured to convert one or more potential words of ranked potential words 329 into a natural language expression using positional information 324 corresponding to such words. Positional information 324 may be configured to provide an indication for movement of identified objects or for differences between sub-images. Output of NLP engine 330 may be one or more conversions 131 provided to apps and/or devices 225, such as previously described and not repeated.

Figure 4:
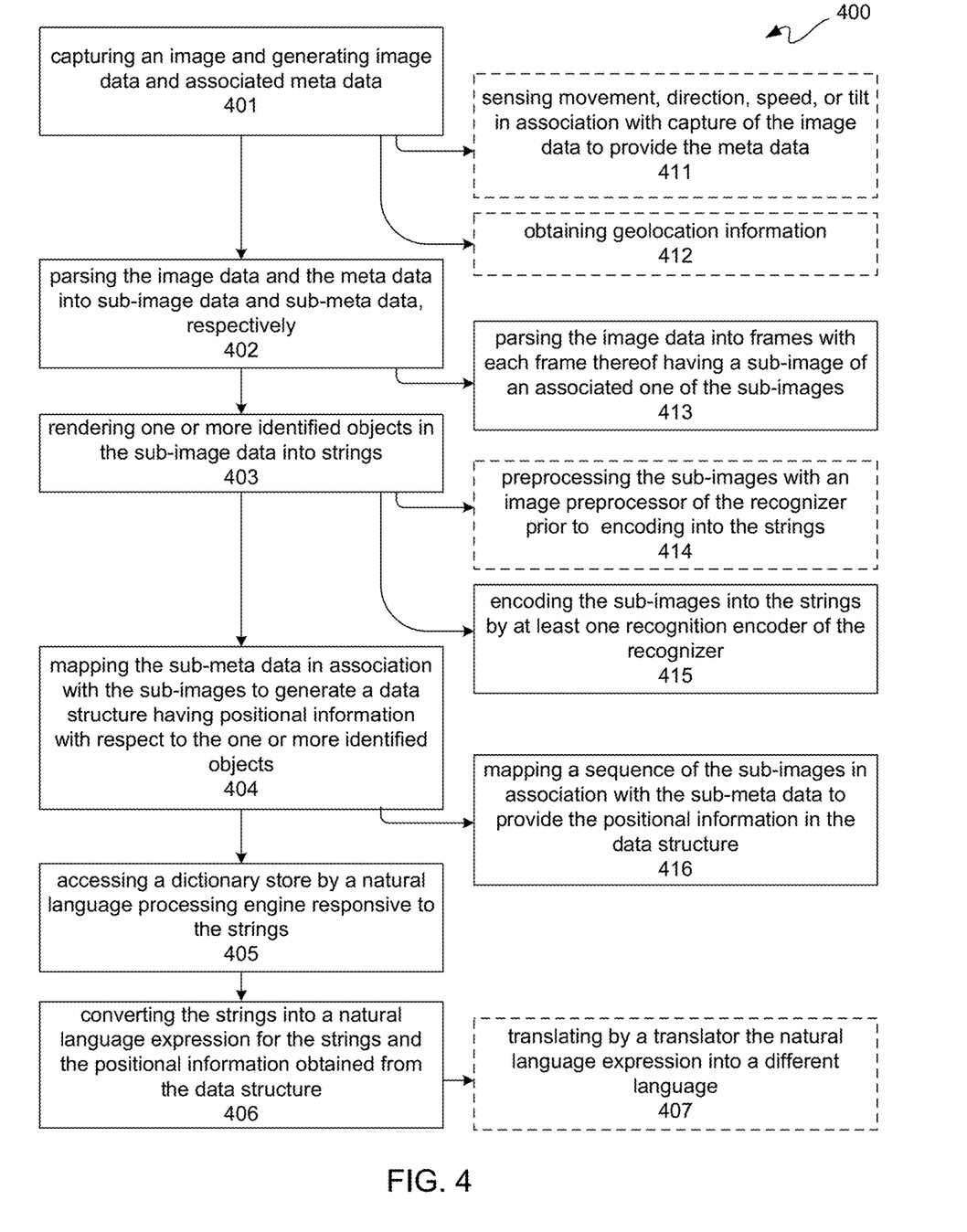
FIG. 4 is a flow diagram depicting an example of an image-to-text recognition flow.

FIG. 4 is a flow diagram depicting an example of an image-to-text recognition flow 400. Image-to-text recognition flow 400 is further described with simultaneous reference to image-to-text recognition systems 100 and 200, respectively of FIGS. 1 and 2.

At operation 401, a device, such as a mobile device 105, may capture an image and generate image data and associated meta data. Operation 401 may optionally include at operation 411 sensing movement, direction, speed, and/or tilt in association with capture of such image data to provide corresponding meta data for such movement, direction, speed and/or tilt of a mobile device 105 during image capture. Operation 401 may optionally include at operation 412 obtaining geolocation information with respect to such mobile device 105.

At operation 402, a parser may parse such image and meta data into sub-image data and sub-meta data, respectively. Operation 402 may include at operation 413 parsing such image data into frames with each frame thereof having a sub-image of an associated one of such sub-images.

At operation 403, a recognizer 115 may render such sub-image data into strings 116 for one or more identified objects in such sub-images. Operation 403 may optionally include at operation 414 preprocessing such sub-images with an image preprocessor of such recognizer 115 prior to encoding into strings 116. Operation 403 may include at operation 415 encoding such sub-images into strings 116 by at least one recognition encoder of such recognizer 115.

At operation 404, a mapper 120 may map such sub-meta data in association with such sub-images to generate a data structure having positional information with respect to such one or more identified objects. Operation 404 may include at operation 416 mapping by such mapper a sequence of such sub-images in association with such sub-meta data to provide such positional information in such data structure.

At operation 405, a dictionary store may be accessed by an NLP engine 130 responsive to strings 116. At operation 406, NLP engine 130 may convert strings 116 into a natural language expression using positional information obtained from such data structure. Optionally, at operation 407 a translator may translate such natural language expression into a different language than an original language of such natural language expression.

Because one or more of the examples described herein may be implemented in using a network, such as for a cloud-based SaaS implementation, or a computing system, as well as a mobile device and an MFP, a detailed description of examples of each is provided. However, it should be understood that other configurations of one or more of these examples may benefit from the technology described herein.

Figure 5:
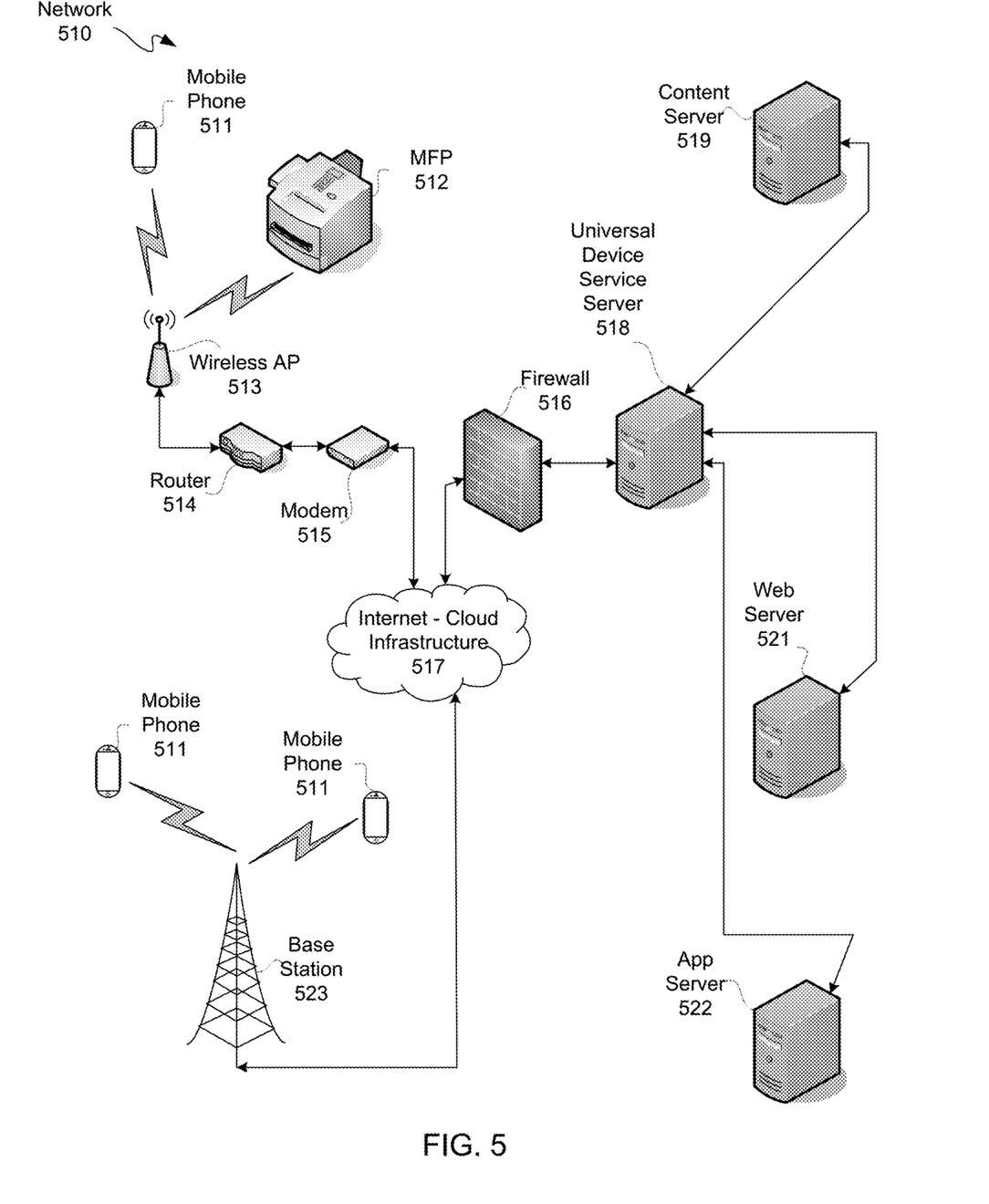
FIG. 5 is a pictorial diagram depicting an example of a network.

FIG. 5 is a pictorial diagram depicting an example of a network 510, which may be used to provide an SaaS platform for hosting a service or micro service for use by a user device, as described herein. Along those lines, network 510 may include one or more mobile phones 511-1, pads 511-2, notebooks 511-3, and/or other web-usable devices 511 in wired and/or wireless communication with a wired and/or wireless access point ("AP") 513 connected to or of a wireless router. Furthermore, one or more of such web-usable wireless devices 511 may be in wireless communication with a base station 523. Additionally, a desktop computer 511-4 and/or an MFP 511-5, each of which may be web-usable devices, may be in wireless and/or wired communication to and from router 514.

Wireless AP 513 may be connected for communication with a router 514, which in turn may be connected to a modem 515. Modem 515 and base station 523 may be in communication with an Internet-Cloud infrastructure 517, which may include public and/or private networks.

A firewall 516 may be in communication with such an Internet-Cloud infrastructure 517. Firewall 516 may be in communication with a universal device service server 518. Universal device service server 518 may be in communication with a content server 519, a web server 524, and/or an app server 522. App server 522, as well as a network 510, may be used for downloading an app or one or more components thereof for accessing and using a service or a micro service as described herein.

Figure 6:
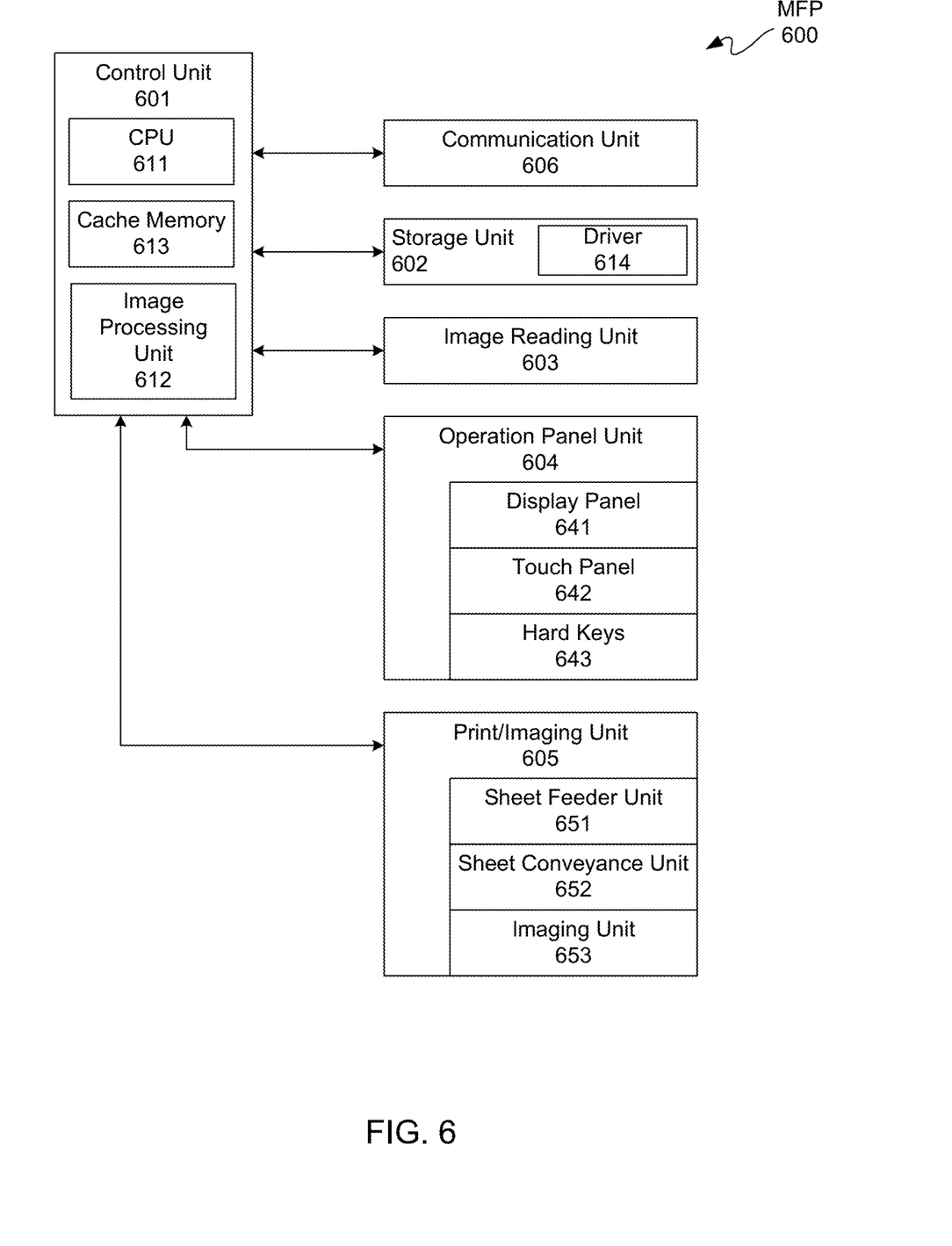
FIG. 6 is a block diagram depicting an example of a multi-function printer (MFP).

FIG. 6 is a block diagram depicting an example of a multi-function printer (MFP) 600. MFP 600 is provided for purposes of clarity by way of non-limiting example. MFP 600 is an example of a data preprocessor subsystem 210 or 310 of FIGS. 2 and 3, respectively.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Storage unit 602 may include ROM, RAM, and large capacity storage memory, such as for example an HDD or an SSD. Storage unit 602 may store various types of data and control programs, including without limitation a printer driver 614.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
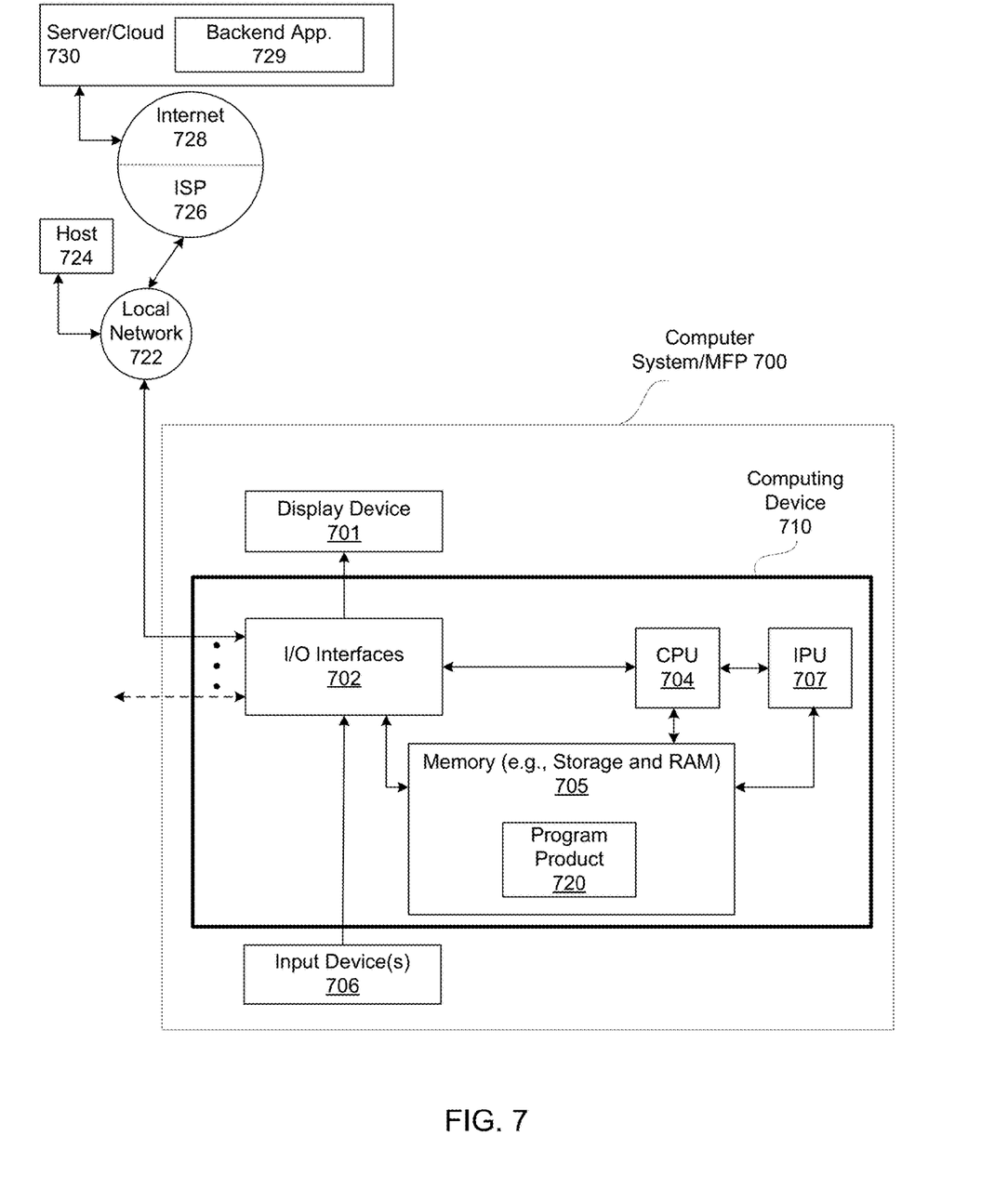
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface")

702. Programmed computing device 710 may optionally include a graphics processing unit ("GPU") 707 coupled to CPU 704 and one or more peripheral cards 709 coupled to I/O interface 702. Along those lines, programmed computing device 710 may include graphics memory 708 coupled to optional GPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, GPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

Figure 8:
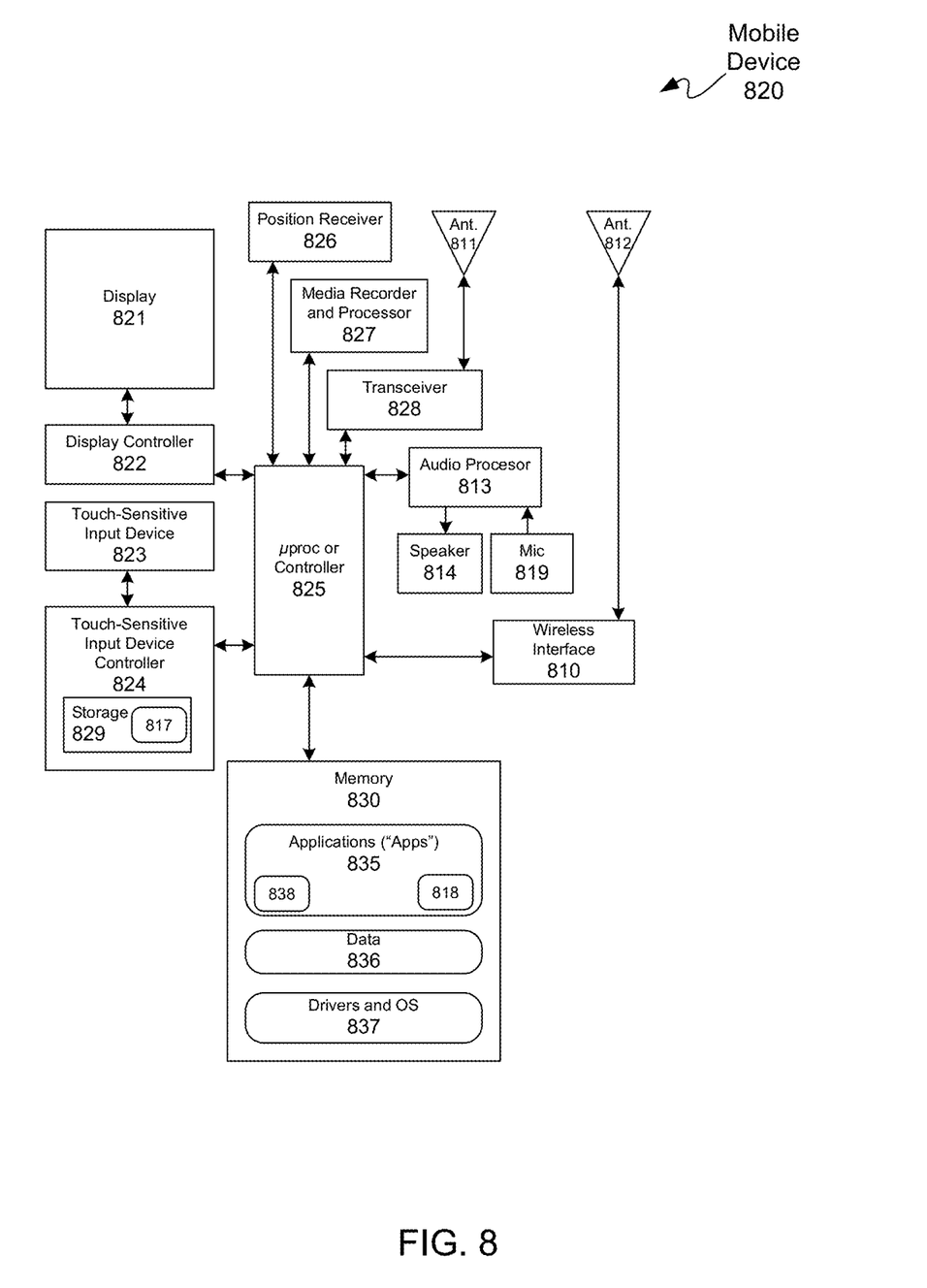
FIG. 8 is block diagram depicting an example of a portable communication device.

FIG. 8 is block diagram depicting an example of a portable communication device ("mobile device") 820. Mobile device 820 may be an example of a mobile device 105, as previously described.

Mobile device 820 may include a wireless interface 810, an antenna 811, an antenna 812, an audio processor 813, a speaker 814, and a microphone ("mic") 819, a display 821, a display controller 822, a touch-sensitive input device 823, a touch-sensitive input device controller 824, a microprocessor or microcontroller 825, a position receiver 826, a media recorder 827, a cell transceiver 828, and a memory or memories ("memory") 830.

Microprocessor or microcontroller 825 may be programmed to control overall operation of mobile device 820. Microprocessor or microcontroller 825 may include a commercially available or custom microprocessor or microcontroller.

Memory 830 may be interconnected for communication with microprocessor or microcontroller 825 for storing programs and data used by mobile device 820. Memory 830 generally represents an overall hierarchy of memory devices containing software and data used to implement functions of mobile device 820. Data and programs or apps as described hereinabove may be stored in memory 830.

Memory 830 may include, for example, RAM or other volatile solid-state memory, flash or other non-volatile solid-state memory, a magnetic storage medium such as a hard disk drive, a removable storage media, or other suitable storage means. In addition to handling voice communications, mobile device 820 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 830 stores drivers, such as I/O device drivers, and operating system programs ("OS") 837. Memory 830 stores application programs ("apps") 835 and data 836. Data may include application program data.

I/O device drivers may include software routines accessed through microprocessor or microcontroller 825 or by an OS stored in memory 830. Apps, to communicate with devices such as the touch-sensitive input device 823 and keys and other user interface objects adaptively displayed on a display 821, may use one or more of such drivers.

Mobile device 820, such as a mobile or cell phone, includes a display 821. Display 821 may be operatively coupled to and controlled by a display controller 822, which may be a suitable microcontroller or microprocessor programmed with a driver for operating display 821.

Touch-sensitive input device 823 may be operatively coupled to and controlled by a touch-sensitive input device controller 824, which may be a suitable microcontroller or microprocessor. Along those lines, touching activity input via touch-sensitive input device 823 may be communicated to touch-sensitive input device controller 824. Touch-sensitive input device controller 824 may optionally include local storage 829.

Touch-sensitive input device controller 824 may be programmed with a driver or application program interface ("API") for apps 835. An app may be associated with a service, as previously described herein, for use of a SaaS. One or more aspects of above-described apps may operate in a foreground or background mode.

Microprocessor or microcontroller 825 may be programmed to interface directly touch-sensitive input device 823 or through touch-sensitive input device controller 824. Microprocessor or microcontroller 825 may be programmed or otherwise configured to interface with one or more other interface device(s) of mobile device 820. Microprocessor or microcontroller 825 may be interconnected for interfacing with a transmitter/receiver ("transceiver") 828, audio processing circuitry, such as an audio processor 813, and a position receiver 826, such as a global positioning system ("GPS") receiver. An antenna 811 may be coupled to transceiver 828 for bi-directional communication, such as cellular and/or satellite communication.

Mobile device 820 may include a media recorder and processor 827, such as a still camera, a video camera, an audio recorder, or the like, to capture digital pictures, audio and/or video. Microprocessor or microcontroller 825 may be interconnected for interfacing with media recorder and processor 827. Image, audio and/or video files corresponding to the pictures, songs and/or video may be stored in memory 830 as data 836.

Mobile device 820 may include an audio processor 813 for processing audio signals, such as for example audio information transmitted by and received from transceiver 828. Microprocessor or microcontroller 825 may be interconnected for interfacing with audio processor 813. Coupled to audio processor 813 may be one or more speakers 814 and one or more microphones 819, for projecting and receiving sound, including without limitation recording sound, via mobile device 820. Audio data may be passed to audio processor 813 for playback. Audio data may include, for example, audio data from an audio file stored in memory 830 as data 836 and retrieved by microprocessor or microcontroller 825. Audio processor 813 may include buffers, decoders, amplifiers and the like.

Mobile device 820 may include one or more local wireless interfaces 810, such as a WiFi interface, an infrared transceiver, and/or an RF adapter. Wireless interface 810 may provide a Bluetooth adapter, a WLAN adapter, an Ultra-Wideband ("UWB") adapter, and/or the like. Wireless interface 810 may be interconnected to an antenna 812 for communication. As is known, a wireless interface 810 may be used with an accessory, such as for example a hands-free adapter and/or a headset. For example, audible output sound corresponding to audio data may be transferred from mobile device 820 to an adapter, another mobile radio terminal, a computer, or another electronic device. In another example, wireless interface 810 may be for communication within a cellular network or another Wireless Wide-Area Network (WWAN).

Figure 91:
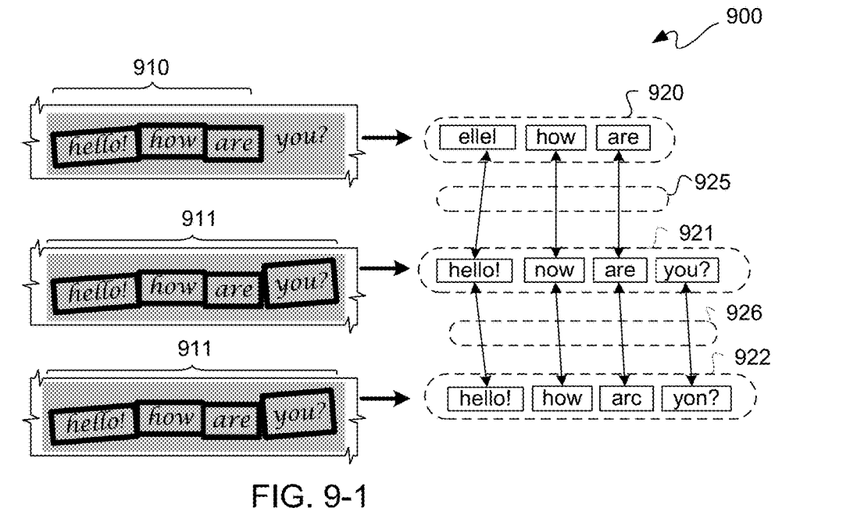
Figure 92:
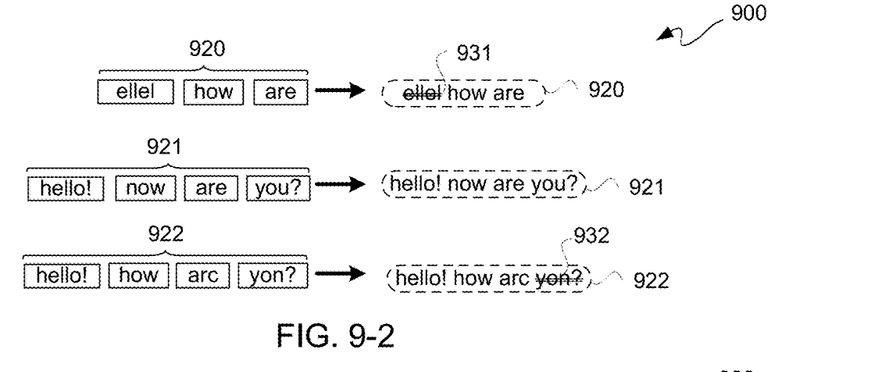
Figure 93:
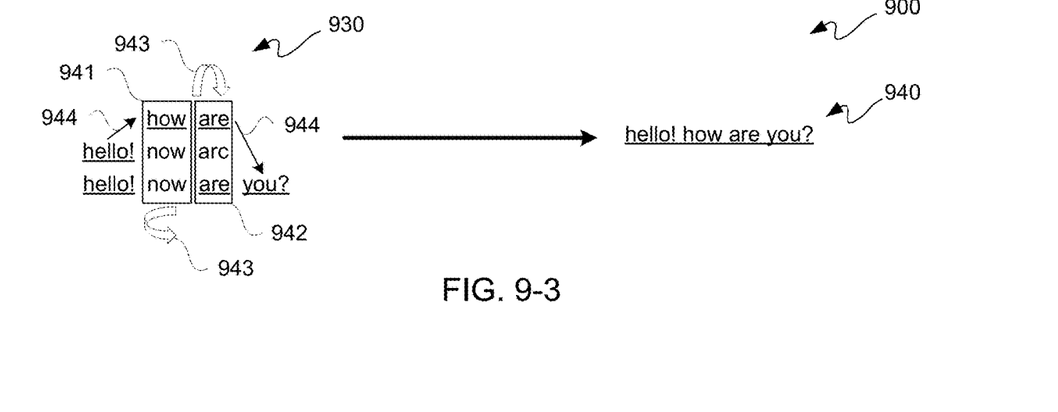

For purposes of clarity by way of example and not limitation, FIGS. 9-1 through 9-3, which are respective pictorial diagrams depicting an example of an image-to-text recognition flow 900 for a sequence of images, is provided. However, this is just one example in accordance with the above description, and by no means is intended to represent all possible example uses and implementations in accordance with the above description.

With reference to FIG. 9-1, a sequence of pictures 910 may be taken. Such sequence of pictures 910 may begin processing for corresponding image-to-text recognition, which in this example is a sequence of recognized words 920.

Additional pictures may be added to sequence of pictures 910, such as indicated by sequence of pictures 911. Along those lines, processing may continue for corresponding image-to-text recognition, which may result in a sequence of recognized words 921 for a sequence of pictures 911. Furthermore, such processing of a sequence of pictures 911 for corresponding image-to-text recognized words may have more than one outcome, such as indicated by image-to-text recognized words 922.

Locations of data of identified text or other items may be tracked relative to other identified text or items, as generally indicated by arrows 925 and 926 for tracking of identified text relative to one another, such as tracking of recognized words 920 through 922 to one another. This is referred to below as slotting or similar description.

With reference to FIG. 9-2, each sequence of recognized words 920 through 922 may be processed, such as through a dictionary, to remove any and all words not in such dictionary, such as in this example "ellel" may be removed at removal operation 931, as generally indicated with a double strike through. Additionally, though a word appears in a dictionary, it may be archaic and thus unlikely to be correct. In this example, the word "yon" may be removed at removal operation 932.

After any and all removal operations, remaining words in each sequence of recognized words 920 through 922 may be processed, where each remaining word stays in its previously assigned slot or position relative to other words in other sequences, namely slotting of words persists.

With reference to FIG. 9-3, remaining words from recognized words 920 through 922, namely after eliminating non-words and possibly archaic words, may be processed for contextualization 930. Potential, but possibly conflicting, words 941 and 942, may be identified by different recognized words occupying a same slot, as generally indicated with a rectangle. Notably, even though an incorrect word may appear more than a correct word within a slot, contextualization may be used to select a correct word, such as selection of "how" over "now" in this example for slotted words 941.

Underlined words in this example, indicate such words are identified as correct within the context of a corresponding sequence of recognized words. For contextualization 930, potential, but conflicting, words 941 and 942 may be rotated 943 in and out of sequences of recognized words 920 through 922 within each corresponding slot until a resulting sequence of recognized contextualized words is obtained. Along those lines, one or more words from one sequence of recognized words of 920 through 922 may be concatenated 944, as generally indicated with arrows going from one level or sequence of words to another level or sequence of words, with one or more words from another sequence of recognized words 920 through 922 to produce a contextualized result 940.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
capturing with a device frames of an image and generating image data and associated meta data;
parsing with a parser the image data and the meta data into sub-image data and sub-meta data, respectively;
rendering with a recognizer the sub-image data into strings for one or more identified objects in the sub-image data;
mapping with a mapper-controller the sub-image data in association with the sub-meta data to generate a data structure having positional information with respect to the one or more identified objects;
accessing a dictionary store by a natural language processing engine responsive to the strings; and
converting by the natural language processing engine the strings into a natural language expression for the strings and the positional information obtained from the data structure.

2. The method according to claim 1, wherein:
the device is a multi-function printer and includes a scanner; and
the one or more identified objects include one or more symbols, words, characters, ideograms, icons, emojis, or logograms.

3. The method according to claim 1, wherein:
the device is a mobile device and includes a camera; and
the one or more identified objects include one or more symbols, words, characters, ideograms, icons, emojis, or logograms.

4. The method according to claim 3, further comprising:
parsing with the parser the image data with each frame thereof having a sub-image of an associated one of sub-images corresponding to the frames;
encoding the one or more identified objects in the sub-images into the strings by at least one recognition encoder of the recognizer; and
mapping by the mapper-controller a sequence of the sub-images in association with the sub-meta data to provide the positional information in the data structure.

5. The method according to claim 4, further comprising sensing with one or more accelerometers of the mobile device one or more of movement, direction, speed, or tilt of the mobile device in association with the capturing of the image to provide the meta data.

6. The system according to claim 5, further comprising:
obtaining geolocation information with a global positioning system of the mobile device; and
wherein the meta data includes the geolocation information with respect to a location of the mobile device during the capturing of the image.

7. The system according to claim 4, wherein the encoding includes using at least one of a character recognition encoder or a word recognition encoder of the recognizer.

8. The system according to claim 7, wherein:
preprocessing the sub-images with an image preprocessor of the recognizer prior to the encoding into the strings;
ranking by the recognizer each string of the strings having multiple recognitions; and
wherein the image is for a digital panorama photo, a digital still photo, a video clip, or a graphical interchange formatted clip.

* * * * *